United States Patent [19]

Olesen

[11] 4,139,088

[45] Feb. 13, 1979

[54] CONVEYER OF THE TILT TRAY TYPE

[75] Inventor: Poul A. Olesen, Aarhus, Denmark

[73] Assignee: Kosan Crisplant A/S, Denmark

[21] Appl. No.: 786,774

[22] Filed: Apr. 12, 1977

[30] Foreign Application Priority Data

Apr. 12, 1976 [GB] United Kingdom ............... 14842/76

[51] Int. Cl.² .......................................... B65G 47/38
[52] U.S. Cl. ..................................... 198/365; 198/796
[58] Field of Search ............... 198/351, 355, 365, 366, 198/370, 796, 802, 706; 214/62 A, 149, 501, 712, 715

[56] References Cited

U.S. PATENT DOCUMENTS

| 3,119,488 | 1/1964 | Rabinow et al. | 198/706 |
| 3,150,763 | 9/1964 | Immesberger | 198/365 |
| 3,163,283 | 12/1964 | Kuwertz | 198/351 |
| 3,265,190 | 8/1966 | Boehm | 198/796 |
| 3,269,520 | 8/1966 | Bishop et al. | 198/365 |
| 3,510,014 | 5/1970 | Speaker et al. | 214/62 A |
| 3,881,609 | 5/1975 | Ellis et al. | 214/11 R |
| 3,945,485 | 3/1976 | Speaker | 198/370 |
| 3,974,909 | 8/1976 | Johnson | 198/365 |
| 4,004,681 | 1/1977 | Clewett et al. | 198/365 |

FOREIGN PATENT DOCUMENTS 665823  7/1963  Canada ................................... 198/355

Primary Examiner—John J. Love
Assistant Examiner—Richard K. Thomson
Attorney, Agent, or Firm—Craig & Antonelli

[57] ABSTRACT

A conveyor of the tilting tray type having the trays tiltable about an axis parallel to the moving direction for transverse unloading of conveyed articles at selected stations along the conveyor. Each of the trays is tiltably mounted on a carriage and has two rollers mounted at either end of a shaft secured to the tray transversely projecting to either side of the tilting axis. The rollers are respectively engaged with diametrically opposed surface portions of a disc member cranked so as to show a horizontal diameter section between respectively upwardly and downwardly slanting side portions, the disc member being mounted by the mid portion of the horizontal section on the upper end of a vertical drive shaft in such a position that the horizontal diameter section supports the rollers and thereby the tray in a locked horizontal position. The drive shaft is reciprocably rotatable about its axis when a radial member thereon abuttingly passes a selectively operable actuator rack displaced into the moving path of the radial member, whereby the horizontal disc section is turned away from its roller supporting position and by the slanting portions respectively urging one roller upwardly and allowing the other roller to move downwardly whereby the tray is tilted.

6 Claims, 3 Drawing Figures

CONVEYER OF THE TILT TRAY TYPE

The present invention relates to a conveyor comprising a train of consecutive article carrier elements movable along a conveyor frame past one or more unloading stations and each being provided with an article support member tiltable crosswise to the moving direction of the conveyor between a substantially horizontal transport position, which support member is provided with or connected to an output member of a transmission, the input member of which is cooperating with actuator means which are arranged stationarily at an unloading station and selectively operable to drive the transmission from a neutral position in which the support member is in its transport position to a position in which the support member is being tilted for causing articles to be unloaded at the unloading station. Thus, the invention relates to a conveyor of the so-called tilt tray type which is usable as a sorting conveyor for conveying articles on the individual trays from a loading station to any of a number of unloading stations, whereby each tray is moved in a horizontal position until it is tilted for unloading the article in the respective unloading station.

The tray is mounted on a carriage running along a carriage rail and is normally held in the horizontal transport position during the run from the loading station to the unloading station by means of a lever arm rigidly secured to the tray so as to depend therefrom and have its lower end following an elongated guiding rail provided along the conveyor. At the unloading stations the rail is provided with switch points by which the lever arm can be selectively swung to the side so as to tilt the tray.

By a known conveyor of said type as disclosed in DT AS 2 037 380 the said lever arm is substituted by a bevel gear system comprising a vertical shaft mounted through the carriage and having a horizontal radial arm projecting generally in the moving direction and having at its outer end a track follower engaged with the guiding rail, whereby a lateral displacement of the track follower in the selected switch point will result in the shaft being turned to thereby tilt the tray, and the tray is generally held in its horizontal position by the track follower following the guiding rail.

Thus the trays in both of these conveyors are stabilized against being tilted unduly by means of the guiding rail along the conveyor, but care should be taken to design the system in such a manner that the rail and the tray tilting system can resist the lateral forces resulting from an eccentric load on the tray, and of course the said switch points should be made with the required high accuracy.

It is the purpose of the invention to provide an improved conveyor in which the tray guiding means may be of simple design.

According to the invention there is provided a conveyor of the type referred to, in which the said transmission means on the carrier elements includes a blocking connection means designed so as to effectively lock the support member in its transport position relative to said carrier element, said blocking connection means being operable by said transmission so as to be releasable by initial movement of the transmission means upon actuation by said actuator means so as to allow the tray to tilt by further actuation movement of the transmission means. In this manner the trays will simply be locked in their horizontal positions to the respective carrier elements, and each tray will remain locked until it arrives at a selected unloading station, where it is released and tilted in a well controlled manner by its transmission means being actuated. Any eccentric forces on the trays will be taken up by the carrier elements themselves, and there will be no need at all to make use of any guiding rail for stabilizing the trays. The said switch points of the known guiding rail may be substituted by simple actuator means operable to be shifted between an inoperative position and an operative position protruding into the moving path of a cooperating part of the transmission means.

Compared with the said known conveyors it is of course particularly important that the said guiding rail or track can be entirely avoided, especially as far as conveyors of great length are concerned.

In a preferred embodiment of the invention the transmission means comprises a cross shaft mounted underneath and parallel with the tray so as to have its axis intersecting the tilting axis of the tray, the cross shaft at its opposite ends having cam follower rollers adapted to be forced up and down, respectively, for tilting the tray by actuation movement of an underlying cam member, this cam member being shaped as a disc mounted in a generally inclined position on the top end of a vertical shaft which is caused to be rotated when the carrier element passes a selected station. The disc is mounted so as to have a horizontal diameter located in the transverse direction when the system is in neutral position, and so as to be inclined in the main moving direction of the conveyor, upwardly and downwardly from said horizontal diameter, respectively, the cam followers in said neutral position will thus cooperate with opposed disc portions adjacent the horizontal diameter. When the inclined disc is rotated by the actuation rotation of said shaft it will, due to its inclination, force one of said cam followers upwardly and allow the opposite cam follower to move correspondingly downwardly, thus causing the tray to tilt under full mechanical control, this in itself being a highly advantageous manner of controlling the tray tilt operations. However, the inclined disc is provided with a stepped, horizontal portion extending as a narrow zone across the disc along said horizontal diameter, and in the neutral position, therefore, the cam followers are both supported by horizontal surface, and the tray is correspondingly locked against tilting by external forces. This does not prevent the shaft and therewith the disc to be rotated, and upon initial rotation, therefore, the disc will cause the tray to tilt laterally according to the direction of rotation of the inclined disc. This arrangement is simple in construction and reliable in operation, and still it does not require guiding rails in addition to the main frame or rail system for the carrier elements.

The said tilt controlling shaft may carry a transverse lever projecting to both sides, whereby the shaft may be rotated to either side simply by arranging for actuator abutment means to project into the moving path of the respective lever end, i.e. traditional rail switch points may be entirely avoided.

The invention will now be described in more detail with reference to the accompanying drawing, in which.

Figure 1:
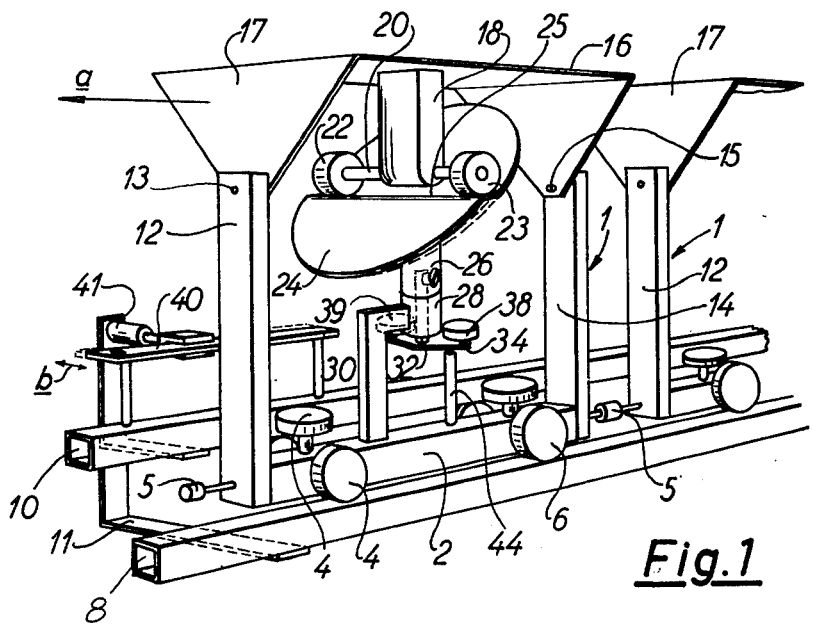
FIG. 1 is a perspective view of a section of a conveyor according to the invention in which the trays are shown in the horizontal position.

The conveyor is made as a train of consecutive article carrier elements generally designated 1 and each comprising a carriage portion 2 guided along a pair of main rails 8 and 10 by four rollers 4 at the front end and four rollers 6 at the rear end thereof, these rollers bearing against respective surface portions of the rails so as to guide the carrier elements in well controlled and non-tiltable manner. The carrier elements are linked together by means of a link member 5. The train of carrier elements is movable in a general moving direction shown by the arrow a, driven by any suitable driving means. Preferably the carrier elements are arranged in an endless row which is moved in a closed horizontal path. The carriage portion 2 has a front end upright 12 and a rear end upright 14 the upper ends of which are provided with pivot pins 13 and 15, respectively, on which there is mounted opposed carrier brackets 17 of a conveyor plate or tray 16 so that the latter is laterally tiltable about an axis through the pivot pins and parallel to the general moving direction of the conveyor.

At the center portion of the tray 16 there is mounted a downwardly projecting bracket 18 the lower end of which carries a transverse shaft 20 provided with two contact rollers 22 and 23 at the opposed shaft ends. The shaft 20 is parallel to the supporting surface of the tray and is placed in a distance from the tray so as to intersect with the tilting axis through the pivot points 13 and 15. The rollers 22 and 23 engage a generally inclined cam disc member 24 which is rigidly secured to the upper end of a vertical shaft 26 journalled in a bearing 28 which is rigidly held by the carriage 2 by means of a carrier bracket 30. The cam disc 24 as shown in FIG. 1 has a stepped portion 25 extending as a narrow horizontal zone across the disc, along a horizontal diameter thereof, from which the disc is inclined upwardly-rearwardly and downwardly-forwardly, and in FIG. 1 the rollers 22 and 23 are both engaging the stepped portion 25, the tray 16 assuming its horizontal transport position.

A lower end portion 32 of the shaft 26 projects beneath the bearing 28 and is provided with lever arms 34 protruding radially and transversely to either side of the end 32 of the shaft 26. On each end portion of the lever arms 34 is provided a horizontal roller 38 and 39, respectively. The roller 39 is selectively engageable with an elongated rack 40 horizontally mounted in connection with the rail system 8, 10 at an unloading station, and the rack 40 is controllable to be moved translatorically into the path line of the roller 39 by means of a working cylinder 41 as indicated by the arrow b, whereby this roller is engaged to be pushed rearwards relative to the carriage 2 as this is moved forwardly and held in this position during the passage of the carriage along the rack 40. By this engagement the lever arm 34 is turned a certain angle clockwise as seen from above and thereby the shaft 26 and the cam disc member 24 are rotated correspondingly.

Figure 2:
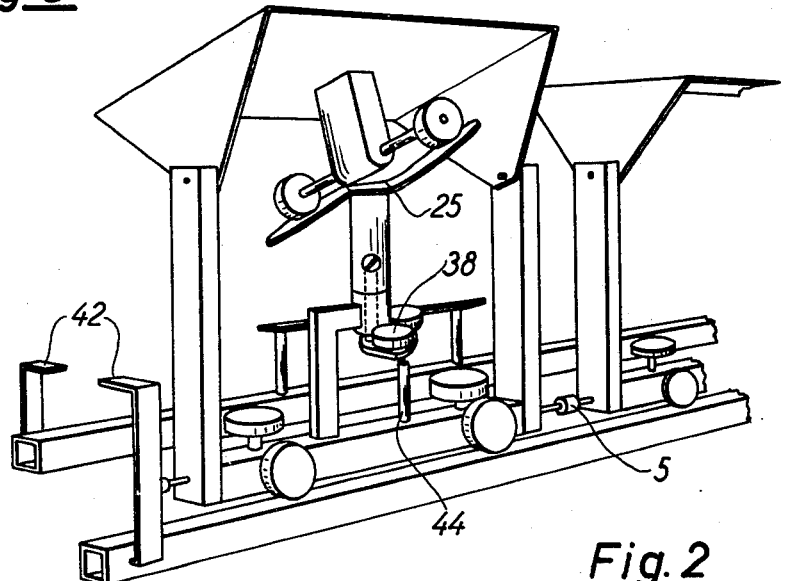
FIG. 2 is a similar view showing one of the trays in a tilted position.

When the disc 24 in this way is turned clockwise the horizontal disc portion 25 is moved away under the rollers and the upper slanting halfpart of the disc 24 will then constitute a cam surface urging the contact roller 23 upwardly, while the opposite roller 22 is allowed to move correspondingly downwardly along the lower halfpart of the disc, i.e. the tray 16 is being tilted under full mechanical control, as illustrated in FIG. 2. Of course, the tray will be tilted to the other side if the actuation 38 meets an actuated rack corresponding to the rack 40, at the other side of the conveyor.

In FIG. 2 is also shown a pair of resetting abutment members 42, which are placed before the loading station to reset the trays into their horizontal position by engaging the swung out rollers 38 or 39 so as to turn the shaft 26 back into its neutral position to thereby raise the trays to their horiziontal positions.

When loading the tray with a package the package may land excentrically on an outer side portion of the tray, whereby one of the contact rollers 22 and 23 will tend to be forced downwards, but this is counteracted effectively by means of the horizontal portion 25 of the disc supporting the respective roller at a right angle to the moving direction thereof.

The disc member 24 may be made of a plate or ring member showing a cam surface being formed so as to secure a firm engagement between both of the rollers 22, 23 and the cam surface, but a firm engagement securing a stabilized position of the tray may also be obtained by resiliently urging the rollers against the disc 24, e.g. by means of a compression spring arranged about the pivot pin 13 between the upright 12 and the vertical portion 17 of the tray 16.

The arrangement of the disc 24 and the rollers 22, 23 as shown in the drawing could to the same effect be mounted invertedly, i.e. the cam disc being mounted in rigid connection with the tray and the shaft and rollers 20 and 22, 23 being mounted horizontally swingable with the shaft 26.

The tilting movement of the tray should not necessarily be transferred through the vertical bracket 18, as this could be substituted by a horizontal member connected to e.g. the vertical portion of the tray about the tilting axis so as to be turned about this axis together with the shaft 20 being tilted. Neither should the tilting mechanism necessarily be provided in between the two uprights 12 and 14 since it in the latter case could be provided in front of or rearwards of the carriage 2. The various rollers could be substituted by simple sliding members.

Figure 3:
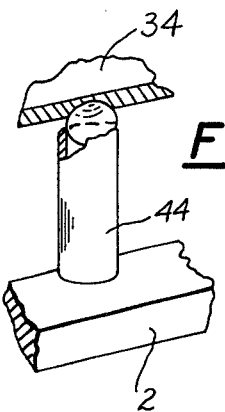
FIG. 3 is a view of one form of tray locking arrangement.

In the cases when the conveyor generally is used for light weight objects it may not be necessary to provide for absolute locking of the trays in the horizontal position, as it may be sufficient to make them arrested by a resilient force such as provided by a ball lock device located at any convenient place, e.g. cooperating with the lever 34. Such a ball lock may be mounted on a post 44 to cooperate with a hole in the underside of the lever 34, (see FIG. 3) this being shaped as a generally triangular member. Further holes may be provided for ball locking the tray in its tilted positions. In these cases the horizontal portion 25 of the cam member could be omitted, whereby the cam member 24 could be a plane slanting disc.

The invention is not restricted to the embodiment described, thus the principle would be of advantage also for a conveyor adapted to unload to one side only.

It will be appreciated that the tray is tiltable by the action of relatively long arms of momentum, this being a mechanical advantage. It is desirable to construct the system with reasonably low building height, and it will be noted that the use of the inclined cam member does not add substantially to the building height, because the uppermost end of the member is swung to one side when the tray is tilted to the other side, i.e. the cam member, despite its relatively high position, forms no obstruction to the tilting of the tray.

The means for locking the trays in their horizontal transport position may be constituted by a locking pawl arrangement including a pawl member for normally arresting the tray against tilting relative to the carrier element, said pawl member being operatively connected with the tilting control means in such a manner that by initial actuation of the tilting control means the pawl is retracted from its locking engagement with its counterpart, e.g. axially parallel with the tilting axis of the tray 16, whereafter the tray is caused to tilt by the further movement of the tilting control means. When returned to its horizontal position the tray may be locked by snap locking of the pawl arrangement.

What is claimed is:

1. A conveyor comprised by a train of consecutive article carrier elements movable along a conveyor or frame past one or more unloading stations and each being provided with an article support member which is laterally tiltable crosswise to the moving direction of the conveyor between a substantially horizontal transport position and a tilted unloading position without otherwise rotating, and cam means for retaining said support member in said transport position and for tilting said support member to said unloading position at said unloading station, said cam means including a cam member carried by one of said carrier elements or said support member, and a cam engaging member carried by the other of said carrier elements or said support member, said cam member being formed of a generally horizontal surface portion interconnecting surface portions which are inclined relative to the horizontal surface portion, the cam member and cam engaging member being rotatable relatively with respect to each other for causing said support member to be tilted as said cam engaging member follows said inclined portions at said unloading station and for holding said support member in said transport position by vertical pressure produced by engagement of said cam engaging element with said horizontal surface portion, and means associated with said unloading station for producing said relative rotation between the cam member and the cam engaging member.

2. A conveyor according to claim 1, in which a rotary shaft is carried by the carrier element, and is shaped generally as a disc mounted centrally at the top end of said rotary shaft in an inclined position thereon, said stepped portion being provided as a bent middle zone of the disc along a horizontal diameter thereof.

3. A conveyor according to claim 1, in which the carrier element is provided with a rotary shaft, and the rotary shaft is rigidly provided with radial lever means projecting laterally outwardly from the shaft so as to be engageable by actuator means selectively positioned in the moving path of said lever means adjacent a selected unloading station so as to effect shaft rotation and tray tilting in response to passage of said actuator means.

4. A conveyor of the type comprised by a train of consecutive article carrier elements movable along a conveyor or frame past one or more unloading stations and each being provided with an article support member which is laterally tiltable crosswise to the moving direction of the conveyor between a substantially horizontal transport position and a tilted unloading position without otherwise rotating, and cam means for retaining said support member in said transport position and for tilting said support member to said unloading position at said unloading station, said cam means including a cam member carried by one of said carrier elements or said support member, and a cam engaging member carried by the other of said carrier elements or said support member, said cam member being annular and having at least one inclined surface portion, the cam member and the cam engaging member being rotatable relative with respect to each other for causing said support member to be tilted as said cam engaging member follows said inclined surface at said unloading station and for bringing said support member into said transport position, said cam means further including means for releasably locking the trays in their horizontal transport position, and wherein said conveyor further comprises means associsted with said unloading station for producing said relative rotation between the cam member and the cam engaging member.

5. A conveyor according to claim 4, wherein said means for locking the trays is formed by a generally horizontal surface portion of said cam member.

6. A conveyor according to claim 4, wherein said means for locking the trays is formed by a ball lock device which arrests the movement of said cam means by a resilient force exerted by the ball locking device engaging a hole in said cam means.

* * * * *